US011055607B2

(12) United States Patent
Leobandung

(10) Patent No.: US 11,055,607 B2
(45) Date of Patent: Jul. 6, 2021

(54) NEURAL NETWORK USING FLOATING GATE TRANSISTOR

(71) Applicant: INTERNATIONAL BUSINESS MACHINES CORPORATION, Armonk, NY (US)

(72) Inventor: Effendi Leobandung, Stormville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 943 days.

(21) Appl. No.: 15/187,037

(22) Filed: Jun. 20, 2016

(65) Prior Publication Data

US 2017/0364790 A1 Dec. 21, 2017

(51) Int. Cl.
*G06N 3/063* (2006.01)

(52) U.S. Cl.
CPC .................................. *G06N 3/063* (2013.01)

(58) Field of Classification Search
CPC ....................................................... G06N 3/063
See application file for complete search history.

(56) References Cited

U.S. PATENT DOCUMENTS

| | | | |
|---|---|---|---|
| 5,055,897 A | 10/1991 | Canepa et al. | |
| 5,136,176 A * | 8/1992 | Castro | G06N 3/0635 706/33 |
| 5,256,911 A | 10/1993 | Holler et al. | |
| 5,268,320 A | 12/1993 | Holler et al. | |
| 5,284,786 A * | 2/1994 | Sethi | H01L 27/115 257/321 |
| 5,298,796 A | 3/1994 | Tawel | |
| 5,336,937 A * | 8/1994 | Sridhar | G06N 3/0635 706/33 |
| 5,353,382 A | 10/1994 | Yariv et al. | |
| 5,444,821 A | 8/1995 | Li et al. | |
| 5,636,160 A * | 6/1997 | Omino | G11C 16/16 365/185.02 |
| 5,806,054 A | 9/1998 | Bergemont et al. | |
| 5,818,081 A | 10/1998 | Ohmi et al. | |
| 5,864,255 A | 1/1999 | Kwok et al. | |
| 5,942,912 A | 8/1999 | Thewes et al. | |
| 6,160,729 A | 12/2000 | Jung et al. | |
| 2011/0119214 A1* | 5/2011 | Breitwisch | G06N 3/0635 706/33 |
| 2012/0001654 A1* | 1/2012 | Strukov | H01L 27/101 326/41 |

(Continued)

FOREIGN PATENT DOCUMENTS

EP 0903672 A2 9/1997

*Primary Examiner* — Daniel C Puentes
(74) *Attorney, Agent, or Firm* — Tutunjian & Bitetto, P.C.; Erik Johnson

(57) ABSTRACT

A neural network device includes a crossbar grid including first metal lines running in a first direction and second metal lines running transversely to the first metal lines and being electrically isolated from the first metal lines. An array of cross-over elements is included. Each cross-over element is connected between a first metal line and a second metal line. The cross-over elements each include a floating gate transistor device having a floating node. The floating node is configured to store a programmable weight value.

20 Claims, 7 Drawing Sheets

(56) References Cited

U.S. PATENT DOCUMENTS

2014/0172937 A1* 6/2014 Linderman .............. G06G 7/16
                                                            708/607
2016/0048755 A1   2/2016 Freyman et al.
2017/0221558 A1* 8/2017 Hu .......................... G11C 11/54

* cited by examiner

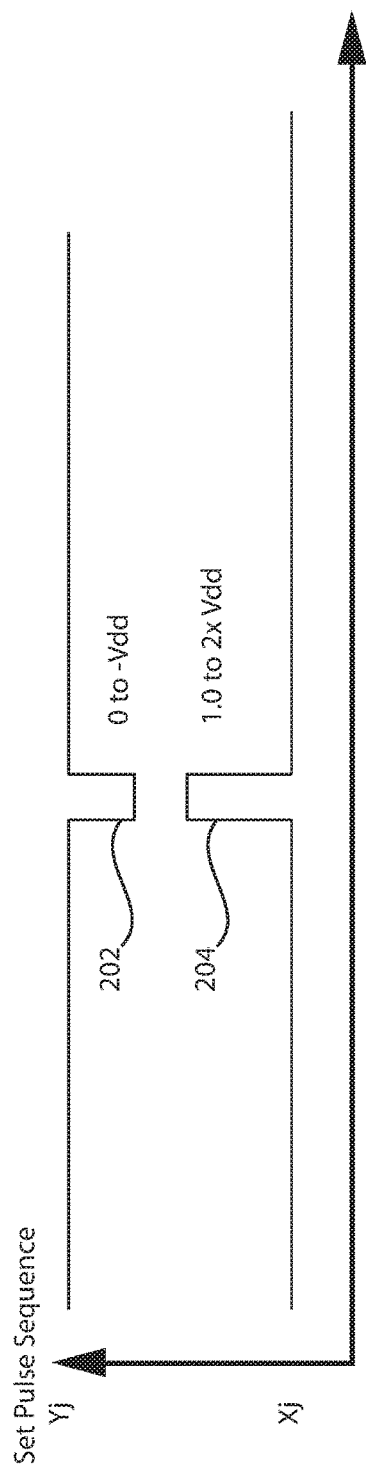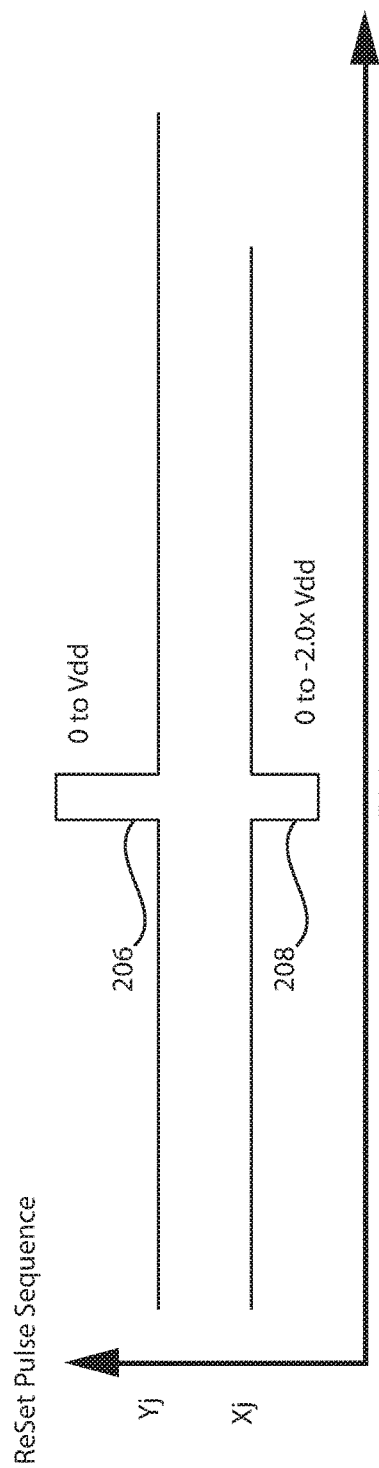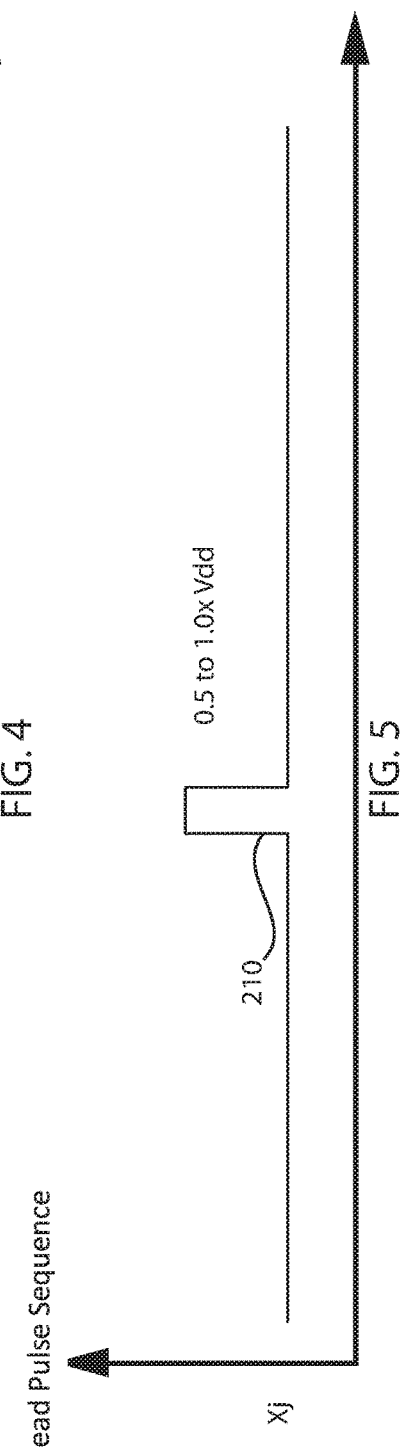

NEURAL NETWORK USING FLOATING GATE TRANSISTOR

BACKGROUND

Technical Field

The present invention generally relates to neural networks, and more particularly to hardware neural networks with programmable weights using floating gate transistors.

Description of the Related Art

Neural networks (NN) are a leading method for implementing machine learning and training for cognitive computing. Neural networks can be implemented in software for flexibility; however, software networks can suffer from longer lag times. Neural networks may be efficiently implemented in hardware using, e.g., cross bar implementations with variable resistance as weights. However, such processing often diverges from standard complementary metal oxide semiconductor (CMOS) processing techniques.

SUMMARY

In accordance with an embodiment of the present principles, a neural network device includes a crossbar grid including first metal lines running in a first direction and second metal lines running transversely to the first metal lines and being electrically isolated from the first metal lines. An array of cross-over elements is included. Each cross-over element is connected between a first metal line and a second metal line. The cross-over elements each include a floating gate transistor device having a floating node. The floating node is configured to store a programmable weight value.

Another neural network device includes a crossbar grid including first metal lines running in a first direction and second metal lines running transversely to the first metal lines and being electrically isolated from the first metal lines. An array of cross-over elements is included. Each cross-over element is connected between a first metal line and a second metal line. The cross-over elements include at least one floating gate transistor device having a floating node, the floating node being configured to store a programmable weight value. Control circuitry is selectively coupled to the crossbar grid to generate and send pulse sequences for setting, resetting or reading the weight value to/from the floating node.

A method for programming a neural network device includes selectively generating pulses on a crossbar grid including first metal lines running in a first direction and second metal lines running transversely to the first metal lines and being electrically isolated from the first metal lines; programming weight values in cross-over elements electrically connected between the first metal lines and the second metal lines in the cross bar grid by storing charge in a floating node of a floating gate transistor device of the cross-over elements; and computing an output using an input modified by the weight values.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein:

FIG. 3 is a timing diagram showing illustrative pulses employed for setting a weight value in a floating gate transistor in accordance with one embodiment of the present principles;

FIG. 4 is a timing diagram showing illustrative pulses employed for resetting a weight value in a floating gate transistor in accordance with one embodiment of the present principles;

FIG. 5 is a timing diagram showing an illustrative pulse employed for reading out a weight value from a floating gate transistor in accordance with one embodiment of the present principles;

DETAILED DESCRIPTION

Figure 1:
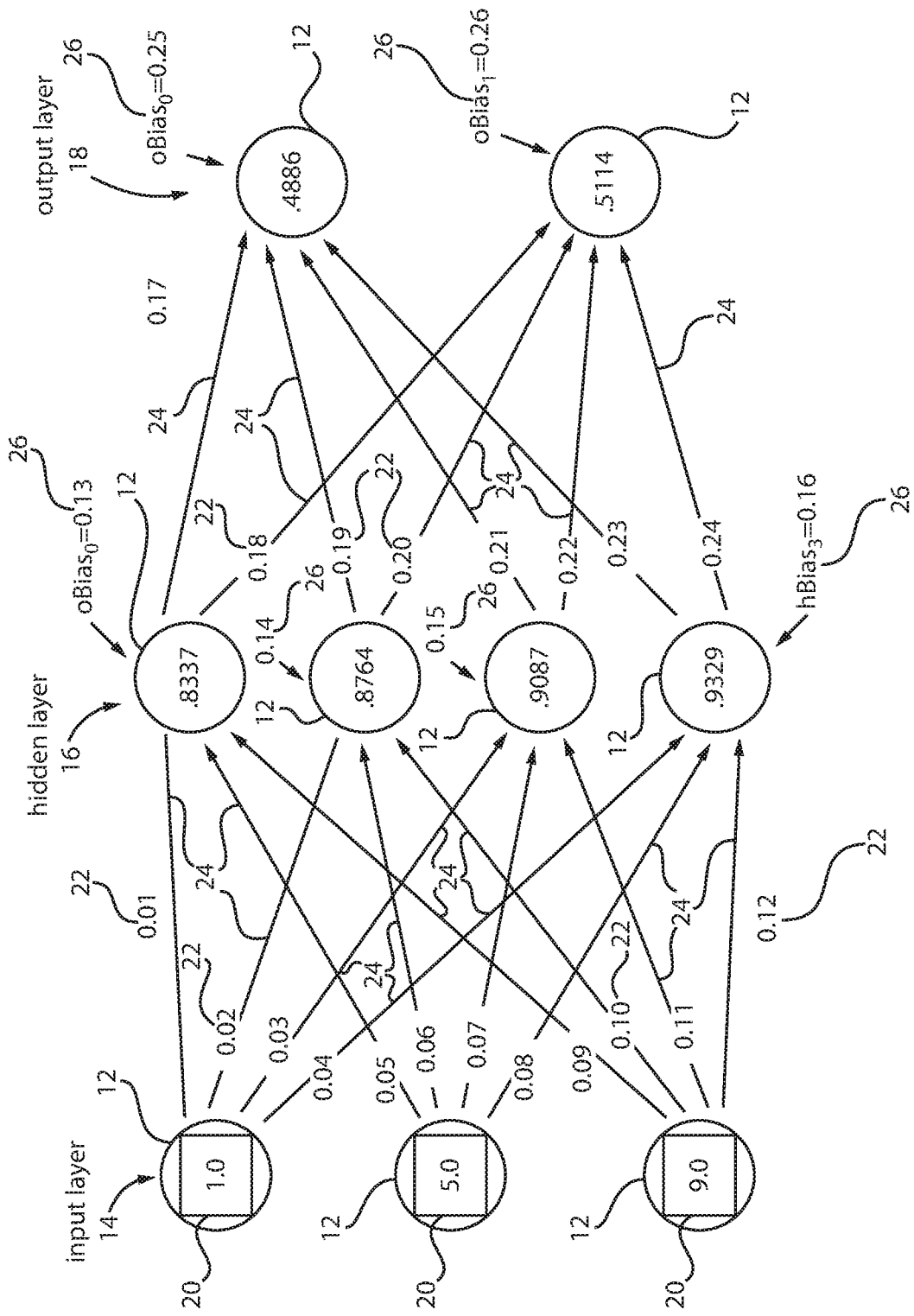
FIG. 1 is a schematic diagram showing an illustrative neural network to be employed in accordance with the present principles.

In accordance with the present principles, floating gate storage devices are employed to provide path weights for neural networks. Floating gate storage devices provide programmable weighting devices and remain consistent with complementary metal oxide semiconductor (CMOS) processing. In one embodiment, floating gate metal oxide semiconductor (MOS) devices are employed as weighting devices in a crossbar neural network implementation. The floating gate devices may include electrical erasable programmable read-only memory (EEPROM). The floating gate storage may also include analog devices depending on frequency of access and overlap between input and output.

It is to be understood that the present invention will be described in terms of a given illustrative architecture; however, other architectures, structures, substrate materials and process features and steps may be varied within the scope of the present invention.

It will also be understood that when an element such as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The present embodiments may include a design for an integrated circuit chip, which may be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer may transmit the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

Methods as described herein may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It should also be understood that material compounds will be described in terms of listed elements, e.g., SiGe. These compounds include different proportions of the elements within the compound, e.g., SiGe includes $Si_xGe_{1-x}$ where x is less than or equal to 1, etc. In addition, other elements may be included in the compound and still function in accordance with the present principles. The compounds with additional elements will be referred to herein as alloys.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Spatially relative terms, such as "beneath," "below," "lower," "above," "upper," and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations), and the spatially relative descriptors used herein may be interpreted accordingly. In addition, it will also be understood that when a layer is referred to as being "between" two layers, it can be the only layer between the two layers, or one or more intervening layers may also be present.

It will be understood that, although the terms first, second, etc. may be used herein to describe various elements, these elements should not be limited by these terms. These terms are only used to distinguish one element from another element. Thus, a first element discussed below could be termed a second element without departing from the scope of the present concept.

Referring now to the drawings in which like numerals represent the same or similar elements and initially to FIG. 1, an illustrative neural network 10 is depicted for explanation of the present principles. The neural network 10 is a "connectionist" computational system where information is processed collectively, in parallel throughout a network of nodes 12 (the nodes, being neurons). The nodes 12 include nodes in an input layer 14, one or more hidden layers 16 and an output layer 18. Information 20 is input in the input layer 14, processed throughout the network 10 and output at the output layer 18.

The neural network is a complex adaptive system, meaning it can change its internal structure based on the information flowing through it. This is achieved through the adjusting of weights 22. Each line 24 represents a connection between two neurons and indicates a pathway for the flow of information or data. Each connection 24 has a weight 22 (e.g., a number) that controls the signal between the two connected neurons. If the network generates an appropriate output, there is no need to adjust the weights. However, if the network generates an inappropriate output or error, then the system adapts, altering the weights to improve subsequent results.

The ability of a neural network 10 to learn and to make adjustments to its structure over time makes the neural network useful in the field of artificial intelligence or other machine learning endeavors, such as, e.g., pattern recognition, time series prediction, signal processing, control systems, soft sensors, etc.

Nodes or neurons 12 may also include bias nodes or values 26. Bias nodes 26 are added to increase the flexibility of the model to fit the data. Hidden bias values (hBias) and output bias values (oBias) are illustratively depicted. Specifically, the bias nodes or values 26 permit the network 10 to fit the data when all input features are equal and very likely decrease the bias of the fitted values elsewhere in the data space. Bias nodes may be added for the input layer and hidden layers in a feedforward network.

Figure 2:
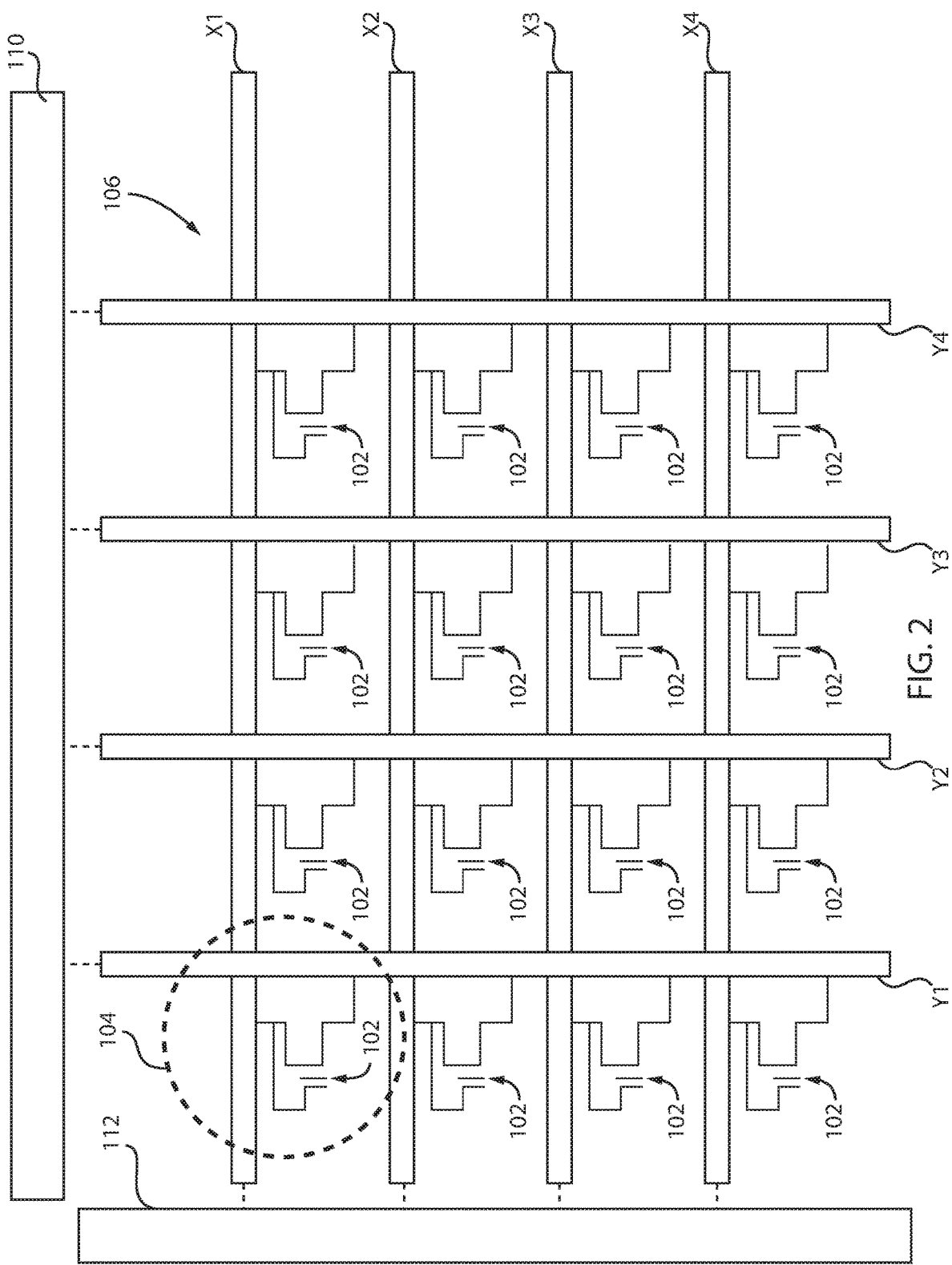
FIG. 2 is a schematic diagram showing a crossbar grid with cross-over elements that include floating gate transistors in accordance with the present principles.

Referring to FIG. 2, a schematic diagram shows a chip layout 100 including an array 106 including metal lines $X_j$ and $Y_j$ where j=the line number (in this example, j=1-4). The metal lines X, Y may include bitlines, wordlines or other structures depending on the grid configuration, where floating gate transistor devices 102 are cross-connected between the metal lines X, Y in the array 106. In one embodiment, the floating gate transistor devices 102 have a source and a gate coupled to one of the metal lines X, Y and a drain coupled to the other of the metal lines X, Y. Other configurations are also possible. In one embodiment, one or more elements 104 of the array 106 may include analog floating gate transistor devices, floating gate transistor devices with additional logic components, floating gate transistor devices with capacitors, etc.

In one embodiment, the floating gate transistor devices 102 include a non-volatile memory, such as an EEPROM, although other device types may be employed. EEPROM is a type of non-volatile memory employed in computers and other electronic devices to store data but permitting the data to be erased and reprogrammed. EEPROMs are organized in an array of floating-gate transistors. EEPROMs can be programmed and erased in-circuit, by applying programming signals. The EEPROM permits data to be read, erased, and re-written individually.

In accordance with the present principles, the floating gate transistor devices 102 can be programmed and reprogrammed with weight values for a neural network application. The floating gate transistor devices 102 apply the weights to incoming signals. Each floating gate transistor device 102 can be adjusted to, e.g., a value between 0 and 1, to provide a multiplier against the incoming signal. Each floating gate transistor device 102 can be individually programmed during a pulse set sequence and can be reprogrammed during a reset sequence to further update the weights. In addition, a read pulse sequence may be provided to read the out the weights for checking or other purposes.

Control circuitry may include circuits 110 and circuits 112 which are selectively coupled to the crossbar grid/array 106 to generate and send pulse sequences for setting, resetting or reading the weight values to/from the floating nodes of the floating gate transistors 102. Circuits 110 and circuits 112 are on-chip and may include logic circuits, powered by supply voltage to generate pulse sequences for controlling and programming the floating gate transistors 102.

Referring to FIGS. 3-5, illustrative timing diagrams are shown in accordance with exemplary embodiments. The timing diagrams depict timing events to trigger floating gate transistor devices to perform different tasks, namely, set a pulse sequence, (FIG. 3), reset a pulse sequence (FIG. 4) and read a pulse sequence (FIG. 5). Other operations and timing diagrams and sequences may also be employed and are contemplated by the present principles.

Referring to FIG. 3, a set pulse sequence is employed to set a value or weight for an individual floating gate transistor device (102). In this example, the metal line $Y_j$ has a pulse 202 decreased from 0 volts to −Vdd (supply voltage), and the metal line $X_j$ has a pulse 204 concurrently increased from 1 volt to 2 times Vdd. The floating gate transistor device can now be programmed with a weight value (e.g., 0-1).

Referring to FIG. 4, a reset pulse sequence is employed to set a value or weight for an individual floating gate transistor device (102). In this example, the metal line $Y_j$ has a pulse 206 increased from 0 volts to Vdd, and the metal line $X_j$ has a pulse 208 concurrently decreased from 0 volts to −2 times Vdd. The floating gate transistor device can now be reprogrammed with a new weight value (e.g., 0-1).

Referring to FIG. 5, a read pulse sequence is employed to read out a value or weight from an individual floating gate transistor device (102). In this example, the metal line $X_j$ has a pulse 210 increased from 0.5 volts to Vdd, and the weight is read out on metal line $Y_j$. It should be understood that other pulse voltages, sequences, etc. may be employed to perform the same or different tasks as described with reference to FIGS. 3-5.

Figure 6:
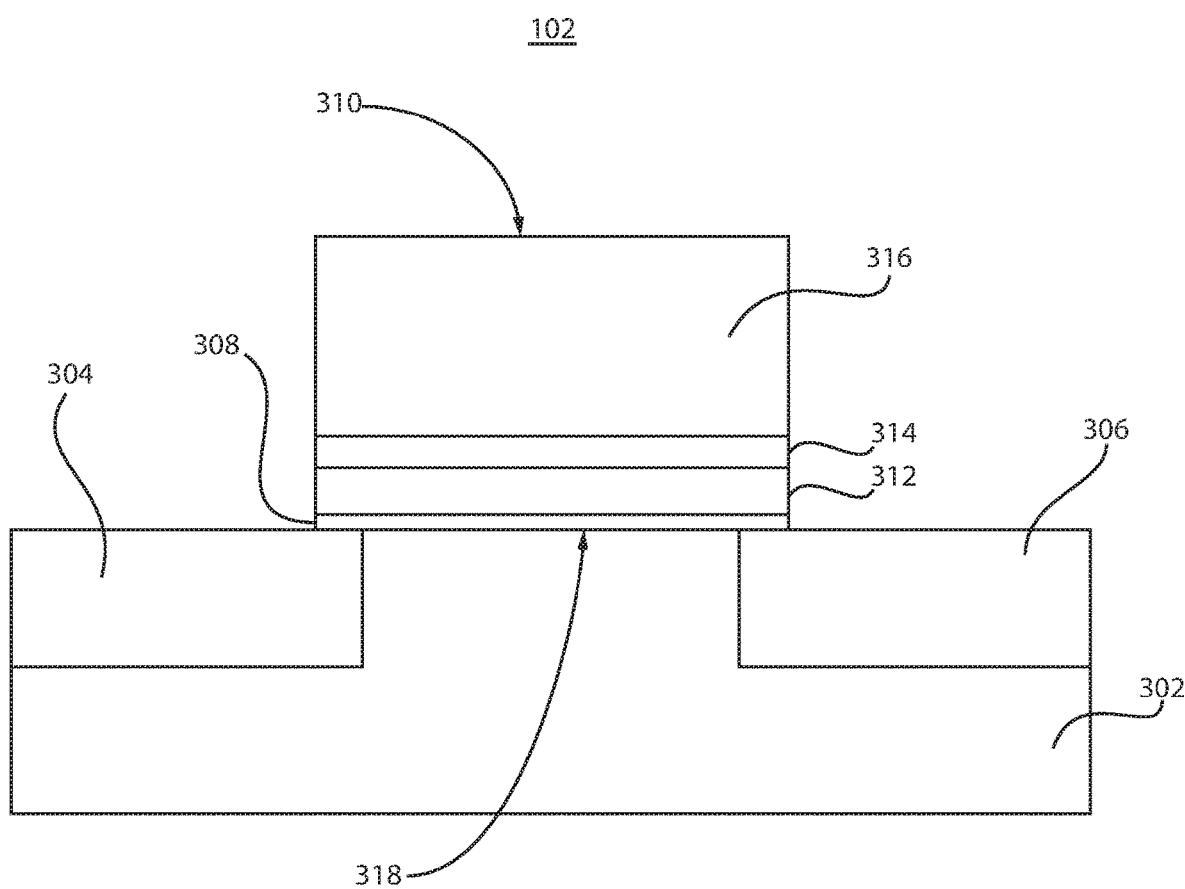
FIG. 6 is a cross-sectional view illustratively showing a floating gate transistor device in accordance with one embodiment of the present principles.

Referring to FIG. 6, a floating gate transistor device 102 is illustratively shown with a planar device structure. However, the floating gate transistor device 102 may be a vertical transistor, a finFET or any other transistor structure. The device 102 includes a substrate 302. The substrate 302 may be crystalline (e.g., monocrystalline). The substrate 302 may be essentially (i.e., except for contaminants) a single element (e.g., silicon), primarily a single element (i.e., with doping), for example, silicon (Si) or germanium (Ge), or the substrate may be a compound semiconductor, for example, a III-V compound semiconductor (e.g., GaAs), SiC, SiGe, or other suitable material(s).

The substrate 302 may also have multiple material layers, for example, a semiconductor-on-insulator substrate (SeOI), a silicon-on-insulator substrate (SOI), germanium-on-insulator substrate (GeOI), or silicon-germanium-on-insulator substrate (SGOI). In one or more embodiments, the substrate 302 may be a silicon wafer. In various embodiments, the substrate is a single crystal silicon wafer. A single crystal silicon substrate may have a <100> or a <111> surface. In the embodiment shown, the substrate 302 includes a bulk substrate.

The substrate 302 may be doped to form source regions 304 and drain regions 306 in the bulk material of the substrate 302. The source region 304 and drain region 306 may be doped by implantation, diffusion or epitaxially grown on the substrate 302 and doped in-situ (during its fabrication). The source/drain regions 304/306 may be n-doped or p-doped. The source/drain regions 304/306 may have a dopant concentration in the range of about $1 \times 10^{19}$ to about $1 \times 10^{22}$ dopant atoms/cm$^3$. In various embodiments, the source/drain regions 304/306 include a same or different material than the substrate 302. It should be noted that the positions of the source and a drain may be interchanged.

A channel region 318 is disposed between the source/drain regions 304/306 and below a floating gate structure 310. The channel region 318 may be doped and may include one or more other dopant regions, e.g., halo dopant regions, etc. The gate structure 310 includes a lower gate dielectric 308. The lower gate dielectric 308 may be grown or deposited by, e.g., atomic layer deposition (ALD) and/or chemical vapor deposition (CVD). The lower gate dielectric 308 may be silicon oxide, silicon nitride, silicon oxynitride, and/or a high-k material, including but not limited to metal oxides such as hafnium oxide (e.g., $HfO_2$), hafnium silicon oxide (e.g., $HfSiO_4$), hafnium silicon oxynitride ($Hf_wSi_xO_yN_z$), lanthanum oxide (e.g., $La_2O_3$), lanthanum aluminum oxide (e.g., LaAlO$_3$), zirconium oxide (e.g., ZrO$_2$), zirconium silicon oxide (e.g., ZrSiO$_4$), zirconium silicon oxynitride (Zr$_w$Si$_x$O$_y$N$_z$), tantalum oxide (e.g., TaO$_2$, Ta$_2$O$_5$), titanium oxide (e.g., TiO$_2$), barium strontium titanium oxide (e.g., BaTiO$_3$—SrTiO$_3$), barium titanium oxide (e.g., BaTiO$_3$), strontium titanium oxide (e.g., SrTiO$_3$), yttrium oxide (e.g., Y$_2$O$_3$), aluminum oxide (e.g., Al$_2$O$_3$), lead scandium tantalum oxide (Pb(Sc$_x$Ta$_{1-x}$)O$_3$), and lead zinc niobate (e.g., PbZn$_{1/3}$Nb$_{2/3}$O$_3$). The high-k dielectric material may further include dopants such as lanthanum and/or aluminum. The stoichiometry of the high-k dielectric material may vary. In various embodiments, the lower gate dielectric 308 may have a thickness in the range of about 5 nm to about 9 nm.

A floating gate 312 includes a conductive material such as polysilicon or doped polysilicon. The floating gate 312 may include a thickness of between about 1 to about 10 nm. An upper dielectric 314 is formed on the floating gate 312. The upper dielectric 314 may include the same or different materials as the lower dielectric 308. The upper dielectric 314 may include a thickness of between about 8 to about 12 nm.

In one or more embodiments, a gate conductor 316 may be deposited over the upper dielectric 314. The gate conductor 316 may include a work function layer (not shown) that may be conformally deposited by ALD and/or CVD. The work function layer may be a nitride, including but not limited to titanium nitride (TiN), hafnium nitride (HfN), hafnium silicon nitride (HfSiN), tantalum nitride (TaN), tantalum silicon nitride (TaSiN), tungsten nitride (WN), molybdenum nitride (MoN), niobium nitride (NbN); a carbide, including but not limited to titanium carbide (TiC), tantalum carbide (TaC), hafnium carbide (HfC), and combinations thereof. The work function layer may have a thickness in the range of about 1 nm to about 11 nm, or may have a thickness in the range of about 2 nm to about 5 nm.

In one or more embodiments, the gate conductor 316 may further include a thin a gate metal layer (not shown) which may be formed on the work function layer, where the gate metal layer may include a thin layer conformally deposited on the work function layer. The gate conductor 316 is deposited and patterned to form a gate electrode that may include tungsten (W), aluminum (Al), titanium nitride (TiN), cobalt (Co), etc. or combinations thereof. In various embodiments, the gate dielectric layer 308, the floating gate 312, the upper dielectric 314 and the gate conductor 316 (and layers thereof) may be etched/patterned in a same or multiple etch processes, e.g., using a reactive ion etch (RIE).

The gate conductor 316 may be or is coupled to one of the metal lines (X$_j$ or Y$_j$) (e.g., a wordline). The floating gate 312 is electrically isolated to create a floating node (312). The floating node may be charged using the gate conductor 316, which is deposited above the floating gate 312 and electrically isolated from the floating gate 312. The gate conductor (or conductors) are capacitively coupled to the floating gate 312. Since the floating gate 312 is completely surrounded by highly resistive material, the charge stored in the floating gate 312 remains unchanged for a period of time. Fowler-Nordheim tunneling, hot-carrier injection mechanisms, induction, etc. may be employed as mechanisms to modify the amount of charge stored in the floating gate 312.

The amount of charge of the floating gate 312 is employed to represent a weight value and can be programmed in accordance with an amount of stored charge. The amount of stored charge on the floating gate 312, the scaling of the gate dielectric materials (308 and/or 314) and the input power to the gate conductor 316 (e.g., 1-5 volts depending on the gate dielectric scaling) may be employed to designate a weight to each individual transistor 102.

The present principles provide a floating gate structure (102) that is completely compatible with standard CMOS processing. The floating gate structure may be employed in hardware neural networks that can be formed on a chip alone or integrated with other structures and devices. The gate structure 310 may further include sidewall spacers, a gate cap and other structures depending on the device type and design.

Figure 7:
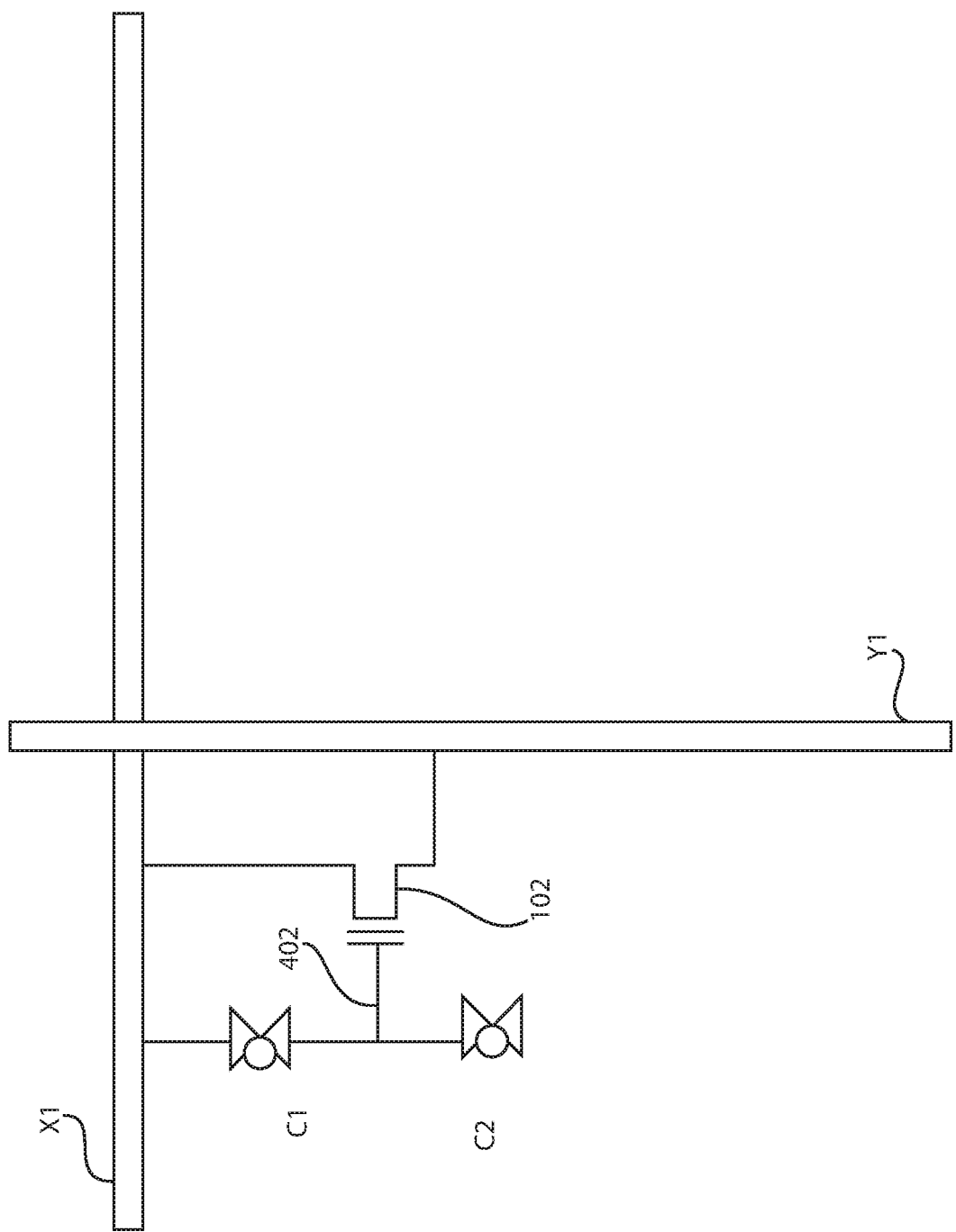
FIG. 7 is a schematic diagram showing a crossbar grid with cross-over elements that include a floating gate transistor and two capacitors in accordance with the present principles.

Referring to FIG. 7, in accordance with another embodiment, additional circuitry may be employed along with the floating gate transistor 102. In the illustrative embodiment depicted, two capacitors C1 and C2 are employed. C1 is coupled between a metal line X1 and a gate 402 of the floating gate transistor 102. C2 is coupled to the gate 402 of the floating gate transistor 102. During operations, C1 is enabled during input transmission on metal line X1, and C2 is enabled during a weight update sequence. The capacitors C1 and C2 can provide added charge to the gate 402 when charging the floating gate node.

Figure 8:
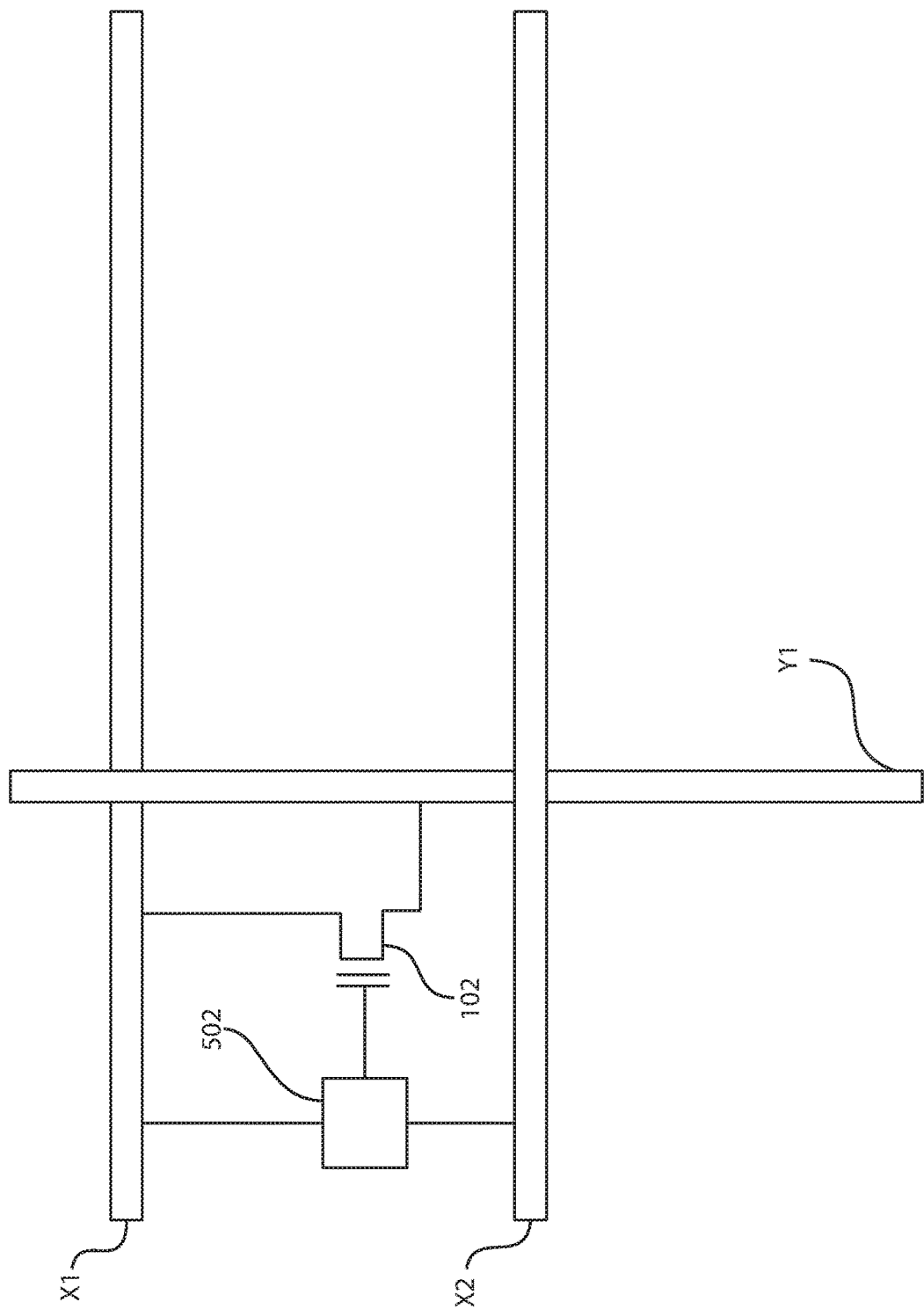
FIG. 8 is a schematic diagram showing a crossbar grid with cross-over elements that include a floating gate transistor and a logic gate or circuit in accordance with the present principles.

Referring to FIG. 8, in accordance with another embodiment, additional circuitry may be employed along with the floating gate transistor 102. In the illustrative embodiment depicted, a logic gate or circuit 502 is employed. The logic circuit 502 may include an AND gate, NAND gate, an OR gate, a NOR gate, an inverter, or any combination of these or other elements. During operations, the logic circuit 502 is enabled during input transmissions on metal lines X1, X2, Y1 or any other combination of metal lines or other lines.

Figure 9:
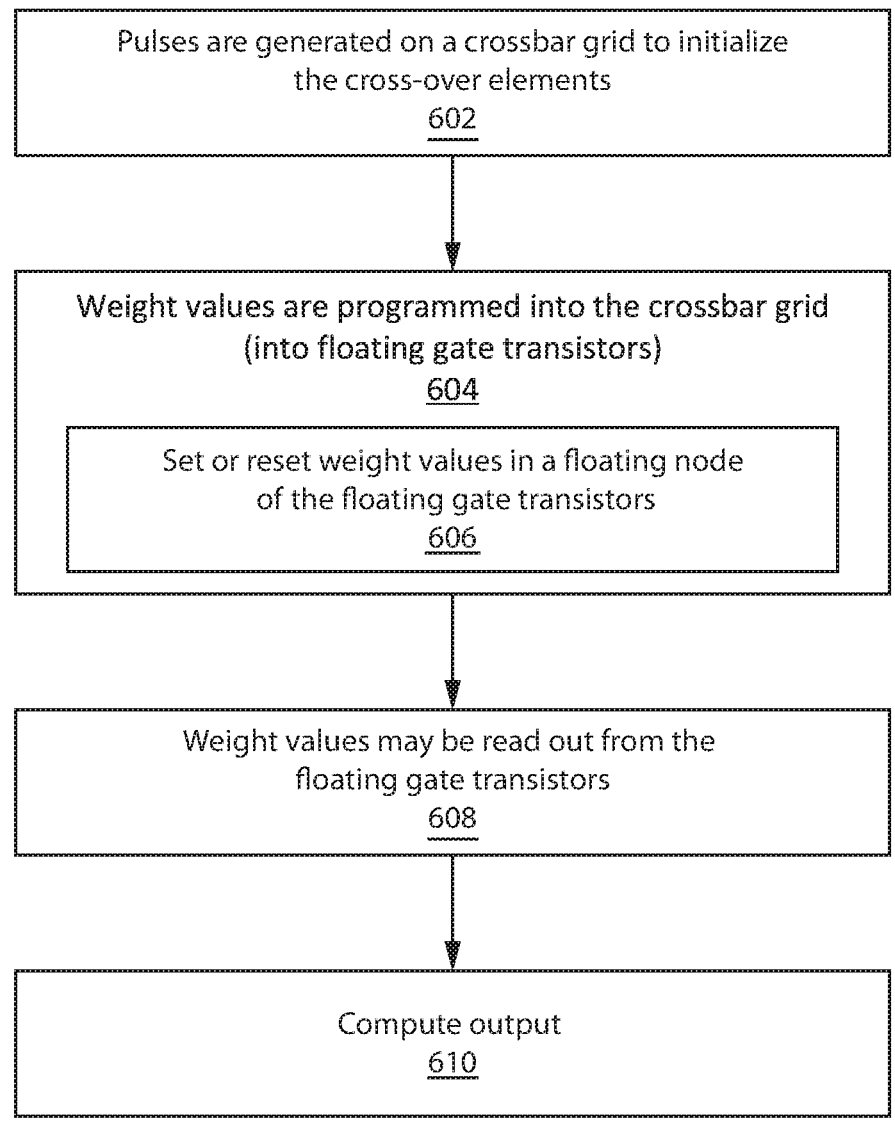
FIG. 9 is a block/flow diagram showing a method for programming a neural network device in accordance with the present principles.

Referring to FIG. 9, a method for programming a neural network device is illustratively shown in accordance with an exemplary embodiment. In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In block 602, pulses are selectively generated on a crossbar grid to enable or initialize cross-over elements. The crossbar grid or array includes first metal lines running in a first direction and second metal lines running transversely to the first metal lines and being electrically isolated from the first metal lines.

In block 604, a weight value is programmed into crossover elements electrically connected between a first metal line and a second metal line in the cross bar grid. This may be done by storing charge in a floating node of a floating gate transistor device of the cross-over elements. The amount of charge stored in the floating node is proportional or correlated to weights computed for the links of the neural network. The weights may be computed manually or automatically and can be updated during operations based on feedback. The cross-over elements may include other additional circuits than the floating gate transistor device. The other circuits may include one or more floating gate transistors (per cell), one or more logic devices, one or more capacitors, etc.

In block 606, the weight value in the cross-over elements may be set (or reset) by concurrent pulses on a first metal line and a second metal line for each floating gate transistor device to be programmed. In block 608, the weight values may be read out on a second metal line in accordance with a pulse on a first metal line.

In block 610, an output (or outputs) is computed through the network using an input values or values modified by the weight values through the network.

Having described preferred embodiments of neural network using floating gate transistor (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A neural network device, comprising:
a crossbar grid including first metal lines running in a first direction and second metal lines running transversely to the first metal lines and being electrically isolated from the first metal lines;
an array of cross-over elements, each of the cross-over elements being connected between a first metal line and a second metal line, each of the cross-over elements including a floating gate transistor device having a floating node, the floating node being configured to store a programmable weight value;
each of the cross-over elements further including a source and a gate coupled to one of the first metal line and the second metal line and a drain coupled to the other of the first metal line and the second metal line; and
control circuitry to generate concurrent pulses on the first metal line and the second metal line for programing the floating node.

2. The neural network device, as recited in claim 1, wherein the control circuitry is configured to generate a set pulse sequence for setting the weight value on the floating node.

3. The neural network device, as recited in claim 1, wherein the control circuitry is configured to generate a reset pulse sequence for changing the weight value on the floating node.

4. The neural network device, as recited in claim 1, wherein the control circuitry is configured to generate a read pulse sequence for reading the weight value on the floating node.

5. The neural network device, as recited in claim 1, wherein the first metal lines include bitlines and the second metal lines include word lines.

6. The neural network device, as recited in claim 1, wherein the cross-over elements additionally include a logic device.

7. The neural network device, as recited in claim 1, wherein the cross-over elements additionally include one or more capacitors.

8. The neural network device, as recited in claim 1, wherein the floating gate transistor device includes a gate structure having a first gate dielectric layer, the floating node, a second gate dielectric layer and a gate conductor.

9. The neural network device, as recited in claim 1, wherein the at least one floating gate transistor device includes an analog device.

10. A neural network device, comprising:
a crossbar grid including first metal lines running in a first direction and second metal lines running transversely to the first metal lines and being electrically isolated from the first metal lines;
an array of cross-over elements, each of the cross-over elements being connected between a first metal line and a second metal line, each of the cross-over elements including a floating gate transistor device having a floating node, the floating node being configured to store a programmable weight value;
each of the cross-over elements further including a source and a gate coupled to one of the first metal line and the second metal line and a drain coupled to the other of the first metal line and the second metal line; and
control circuitry selectively coupled to the crossbar grid to generate and send pulse sequences for setting, resetting or reading the weight value to/from the floating node, wherein control circuitry is configured to further generate concurrent pulses on the first metal line and the second metal line for programing the floating node.

11. The neural network device, as recited in claim 10, wherein the first metal lines include bitlines and the second metal lines include word lines.

12. The neural network device, as recited in claim 10, wherein the cross-over elements additionally include a logic device.

13. The neural network device, as recited in claim 10, wherein the cross-over elements additionally include one or more capacitors.

14. The neural network device, as recited in claim 10, wherein the at least one floating gate transistor device includes a gate structure having a first gate dielectric layer, the floating node, a second gate dielectric layer and a gate conductor.

15. The neural network device, as recited in claim 10, wherein the at least one floating gate transistor device includes an analog device.

16. A method for programming a neural network device, comprising:
selectively generating pulses on a crossbar grid including first metal lines running in a first direction and second metal lines running transversely to the first metal lines and being electrically isolated from the first metal lines;
programming weight values in cross-over elements electrically connected between the first metal lines and the second metal lines in the crossbar cross bar grid by storing charge in a floating node of a floating gate transistor device of the cross-over elements by concurrent pulses on a first and second metal line for each floating gate transistor, wherein a source and a gate of the floating gate transistor device are coupled to one of the first and second metal line and a drain of the floating gate transistor device is coupled to the other of the first and second metal line; and
computing an output using an input modified by the weight values.

17. The method, as recited in claim 16, wherein the cross-over elements additionally include a logic device.

18. The method, as recited in claim 16, wherein the cross-over elements additionally include one or more capacitors.

19. The method, as recited in claim 16, wherein programming the weight values in the cross-over elements includes setting the weight values.

20. The method, as recited in claim 16, further comprising reading out the weight values on a second metal line in accordance with a pulse on a first metal line.

* * * * *